(12) United States Patent
Rayner

(10) Patent No.: US 9,172,501 B2
(45) Date of Patent: Oct. 27, 2015

(54) LAUNCH DELAY OFFSET DATA FLOW PROTECTION

(71) Applicant: Nevion USA, Inc., Oxnard, CA (US)

(72) Inventor: Andrew Rayner, Felixstowe (GB)

(73) Assignee: Nevion Europe AS, Sandefjord (NO)

( * ) Notice: Subject to any disclaimer, the term of this patent is extended or adjusted under 35 U.S.C. 154(b) by 110 days.

(21) Appl. No.: 13/863,890

(22) Filed: Apr. 16, 2013

(65) Prior Publication Data

US 2013/0283118 A1 Oct. 24, 2013

Related U.S. Application Data

(60) Provisional application No. 61/625,901, filed on Apr. 18, 2012.

(51) Int. Cl.
*G11C 29/00* (2006.01)
*H04L 1/00* (2006.01)
*H04L 1/06* (2006.01)

(52) U.S. Cl.
CPC ............... *H04L 1/0056* (2013.01); *H04L 1/06* (2013.01)

(58) Field of Classification Search
CPC ... H04L 1/0045; H04L 1/0057; H04L 1/0061; H04L 1/0071; G11B 20/18
USPC ........................................................ 714/746
See application file for complete search history.

(56) References Cited

U.S. PATENT DOCUMENTS

| | | | |
|---|---|---|---|
| 2002/0165961 A1* | 11/2002 | Everdell et al. | 709/225 |
| 2004/0133836 A1* | 7/2004 | Williams | 714/746 |
| 2006/0077888 A1 | 4/2006 | Karam et al. | |
| 2009/0003320 A1 | 1/2009 | Luo et al. | |
| 2011/0066915 A1* | 3/2011 | Arye | 714/752 |
| 2011/0121838 A1 | 5/2011 | Gillis et al. | |
| 2015/0129666 A1* | 5/2015 | Butler et al. | 235/492 |

FOREIGN PATENT DOCUMENTS

| | | |
|---|---|---|
| KR | 10-2008-0059976 A | 7/2008 |
| WO | 02067120 A1 | 8/2002 |

OTHER PUBLICATIONS

Begen, A. et al., Duplicating RTP Streams, Internet Engineering Task Force (IETF) Trust Document, Jul. 2, 1012, pp. 1-11, Internet-Draft, University of Glasgow; See first page showing revision history.
Begen, A. et al., Duplicating RTP Streams, Internet Engineering Task Force (IETF) Trust Document, Dec. 30, 2012, pp. 1-11, Internet-Draft, University of Glasgow.
Begen, A. et al., Duplicating RTP Streams, Internet Engineering Task Force (IETF) Trust Document, Mar. 21, 2013, pp. 1-10, Internet-Draft, University of Glasgow.

* cited by examiner

*Primary Examiner* — Albert Decady
*Assistant Examiner* — Enam Ahmed
(74) *Attorney, Agent, or Firm* — Paul D. Chancellor; Ocean Law

(57) ABSTRACT

A signal protector utilizes a dual data path delay offset enabling signal recovery on both paths following simultaneous data loss on both paths.

8 Claims, 2 Drawing Sheets

LAUNCH DELAY OFFSET DATA FLOW PROTECTION

PRIORITY CLAIM

This application claims the benefit of U.S. Prov. Pat. App. No. 61/625,901 filed Apr. 18, 2012 and entitled LAUNCH DELAY OFFSET DATA FLOW PROTECTION.

BACKGROUND OF THE INVENTION

Known signal protection schemes include error correction using multiple channels and/or large static buffers. Such systems utilize excessive bandwidth and/or introduce relatively long latency. Although signal protection innovations are not a focus area of the telecommunications industry, improvements that are adopted by the industry have the potential to benefit large groups of consumers.

Field of Invention

This invention relates to the electrical arts. In particular, a signal is protected through the use of launch delay offset.

Discussion of the Related Art

Some signal protection systems are known. For example, some signal protection systems merely use simultaneous broadcasts on dual paths allowing for redundancy via switching between the paths. However, signal protection developments have not generally been a focus area of the telecommunications industry, perhaps due to the widespread use of the dual path protection system mentioned above. But, known systems generally suffer from one or more of hardware complexity, software complexity, high initial cost, high operating costs, large additions to required bandwidth, and signal degradation. Selected embodiments of the present invention provide solutions to one or more of these problems.

SUMMARY OF THE INVENTION

The present invention provides a signal protector utilizing dual data paths with a delay offset. In an embodiment, a data protection method comprises the steps of: providing data path A and data path B; each of the data paths extending between first and second stations; paths A and B transporting the same data; and, offsetting the data transported by path A from the data transported by path B by a time "t" such that following a simultaneous data loss on both paths during a time interval that is less than or equal to "t" an uninterrupted data flow can be recovered using a combination of information from both data paths.

In an embodiment, a data protection method comprising the steps of: providing a data transmitting block for receiving and forwarding data and a data receiving block for receiving the forwarded data and delivering data; coupling dual redundant data paths A and B between the data transmitting block and the data receiving block; configuring the transmitting block to transmit redundant data on data path B time "t" later than the data transmitted on path A; and, maintaining an uninterrupted flow of delivered data following a simultaneous data loss on both paths of duration less than or equal to "t" by merging data from paths A and B to provide at least some of the data delivered following to the data loss.

BRIEF DESCRIPTION OF THE DRAWINGS

The present invention is described with reference to the accompanying figures. The figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Where parts are connected, descriptions herein include the term "coupled" which refers to either direct or indirect connections. Direct connections provide for a first part connected directly to a second part, for example A connected directly to B. Indirect connections provide for a first part connected indirectly to a second part, for example A connected indirectly to C via B.

Figure 1:
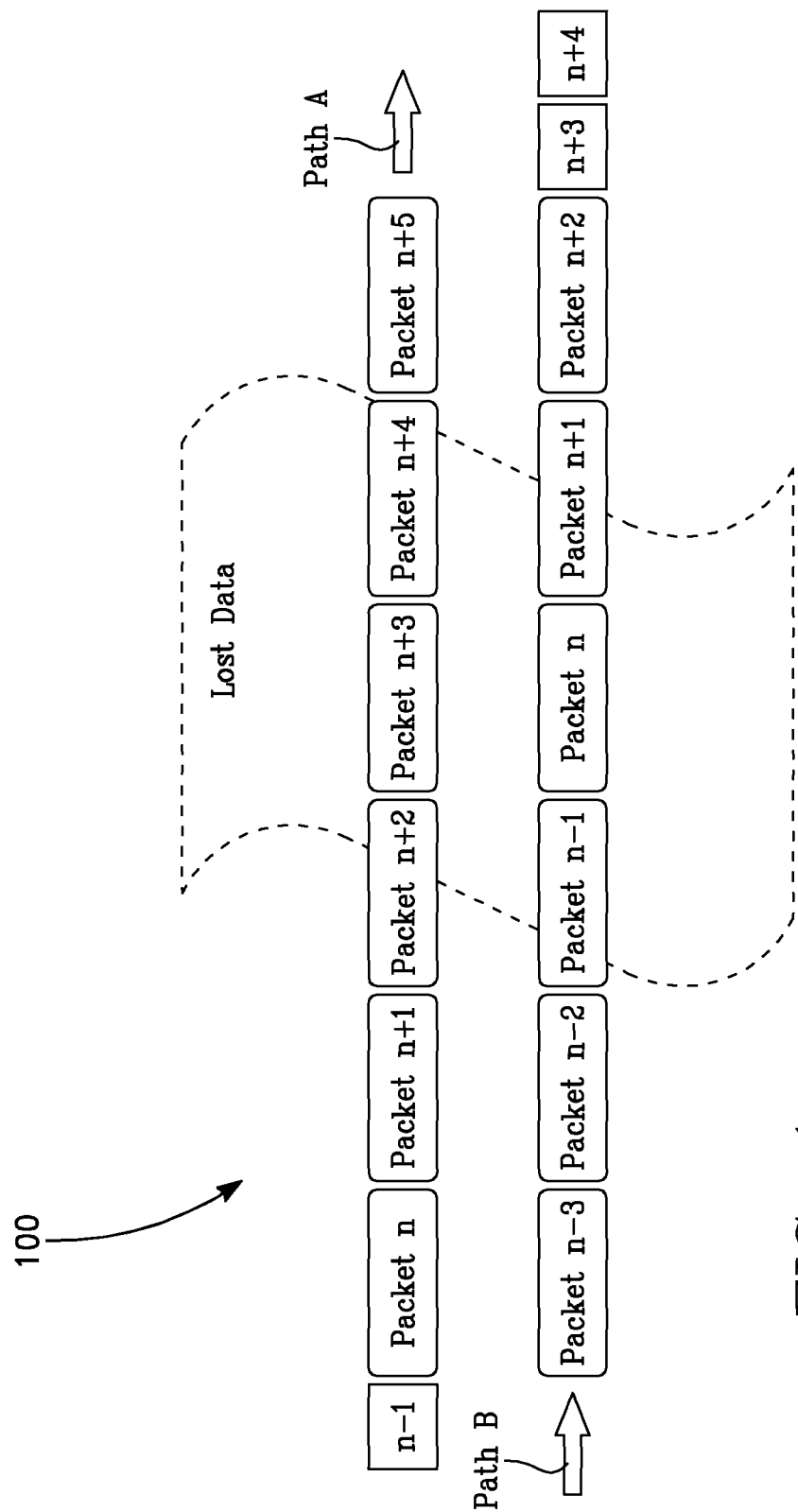
FIG. 1 shows a protection system in accordance with the present invention.

FIG. 1 shows a signal protection system in accordance with the present invention 100. Data paths A and B transport packet flows. As shown, Paths A and B are offset.

An exemplary Data Loss is shown. Here, Path A packets n+2, n+3, n+4 are lost and Path B packets n−1, n, n+1 are lost.

Recovery following the Data Loss is seen as follows. Path A is rebuilt using unlost packets n+2, n+3, n+4 of path B. Path B is rebuilt using unlost packets n−1, n, n+1 of Path A. In various embodiments, unlost packets are recovered and data streams are rebuilt using one or more of memories, buffers, switches, and other similar data processing equipment.

Figure 2:
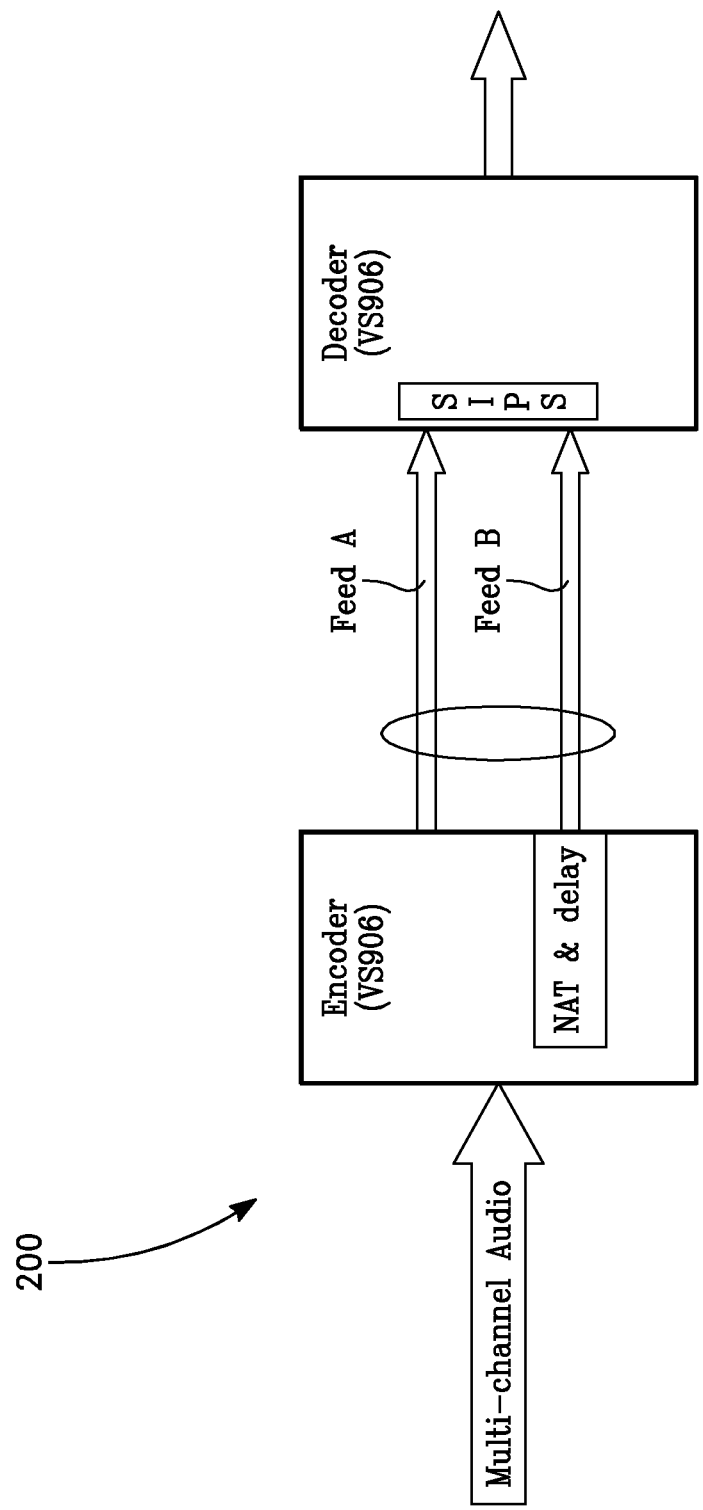
FIG. 2 shows an embodiment of the protection system of FIG. 1.

FIG. 2 shows the signal protection system of FIG. 1 implemented in a multi-channel audio transport system 200. Both data feeds are in the same pipe with VLAN separation and in this example Feed B is delayed with respect to Feed A by 70 ms. As shown, the feeds extend between an encoder originating the data and a decoder processing the data forwarded by the encoder.

In various embodiments this data protection system enables recovery from simultaneous data loss in redundant, offset data paths. And, in various embodiments, dual path synchronized transmission data protection systems are adapted to implement the delay offset of the present invention.

In an example utilizing an embodiment of the present invention, a national radio network entity operating a private IP network implemented the present invention to resolve short, simultaneous data losses on dual diverse paths through the network where disturbances were less than 50 milliseconds in duration. The solution provides at a transmitting end a network feed source and a network adapter for delaying one of redundant network feeds by 70 milliseconds. Exemplary equipment includes a network adapter in the form of a Nevion Ventura VS906 IP Media Edge Adapter. With an audio input, the adapter provides dual redundant IP data flows carrying the audio information.

Receiving equipment provides delay equalization for the redundant paths and adjusts for both network delay and artificial delay to create one integral feed. A complementary receiving end adapter takes in the two network data flows and merges them to provide a merged data flow from which the audio information is decapsulated. This technique provides uninterrupted delivery of the transported audio information despite short, simultaneous network disturbances. Skilled artisans will of course recognize the present invention is not limited to particular transmission media or information transmission protocols.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A data protection method comprising the steps of:
providing data path A and data path B;
each of the data paths extending between first and second stations;
paths A and B transporting the same data; and,
offsetting the data transported by path A from the data transported by path B by a time "t" such that following a simultaneous data loss on both paths during a time interval that is less than or equal to "t" an uninterrupted data flow can be recovered using a combination of information from both data paths.

2. A data protection method comprising the steps of:
providing a data transmitting block for receiving and forwarding data and a data receiving block for receiving the forwarded data and delivering data;
coupling dual redundant data paths A and B between the data transmitting block and the data receiving block;
configuring the transmitting block to transmit redundant data on data path B time "t" later than the data transmitted on path A; and,
maintaining an uninterrupted flow of delivered data following a simultaneous data loss on both paths of duration less than or equal to "t" by merging data from paths A and B to provide at least some of the data delivered following to the data loss.

3. The data protection method of claim 1 wherein data lost from path A is replaced by data from path B and wherein data lost from path B is replaced by data from path A.

4. A lost data recovery method comprising the steps of:
providing data path A for transporting data packets;
providing data path B for transporting data packets;
each of the data paths extending between first and second stations;
paths A and B transporting the same data packets; and,
offsetting the data transported by path A from the data transported by path B by a time "t" such that following a simultaneous data loss on both paths during a time interval that is less than or equal to "t" an uninterrupted data flow can be recovered by combining data from both data paths;
wherein packets lost from path A are replaced by packets from path B and wherein packets lost from path B is replaced by packets from path A.

5. The method of claim 4 wherein paths A and B are implemented in the same media using VLAN separation.

6. The method of claim 5 wherein t is at least 50 milliseconds.

7. The method of claim 4 wherein path A interconnects with the first and second stations and path B interconnects with the first and second stations.

8. The method of claim 4 wherein:
the first station is an encoder and the second station is a decoder;
path A interconnects the encoder with a decoder SIPS;
path B interconnects an encoder NAT and delay block with the decoder SIPS; and,
data paths A and B transport multi-channel audio.

* * * * *